March 17, 1964   G. W. MORK ETAL   3,125,226
DISCONNECT MEANS
Filed Sept. 28, 1962   2 Sheets-Sheet 1
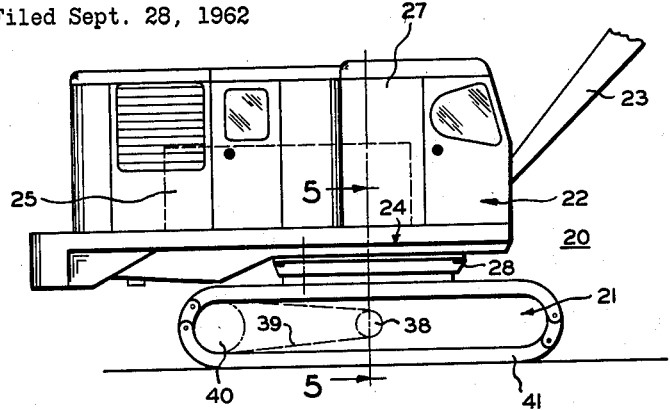
FIG. 1
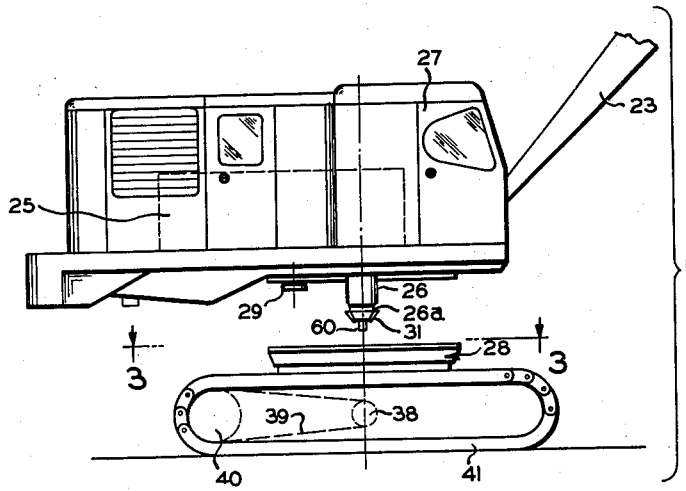
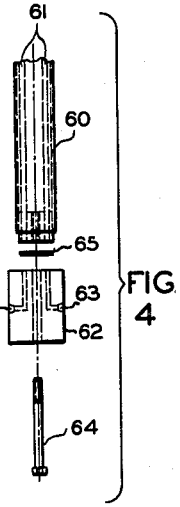
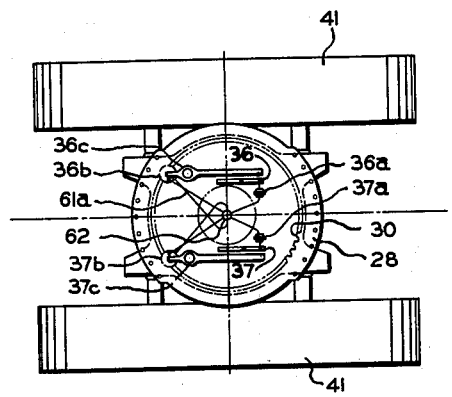
FIG. 3
GEORGE W. MORK
RALPH L. BAUER
MAX D. WOLFF
*INVENTORS,*
BY
ATTORNEY

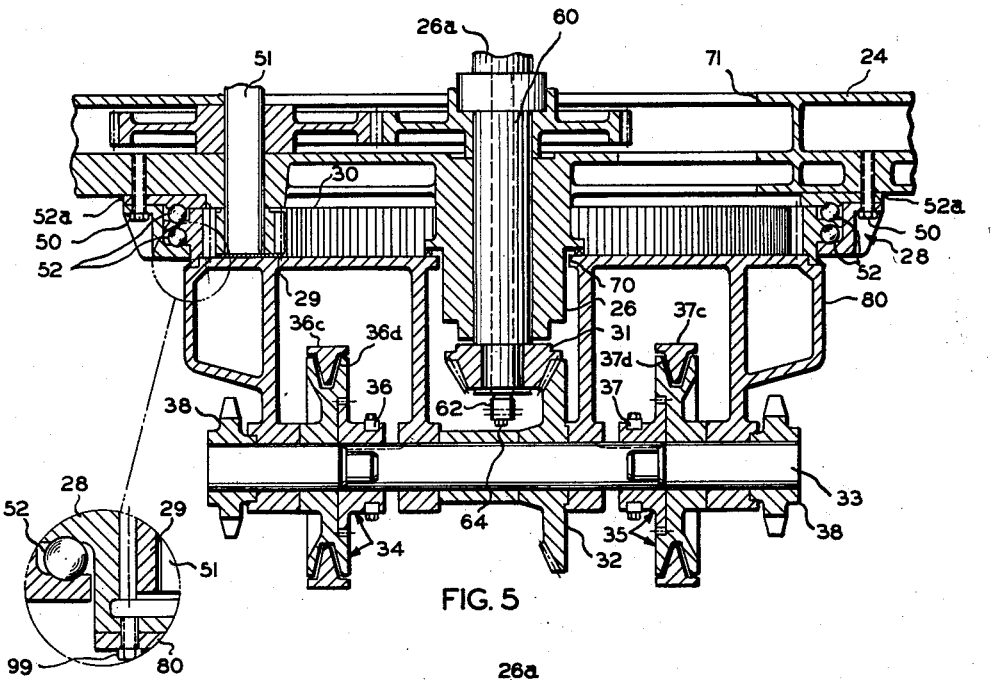
FIG. 5
FIG. 7
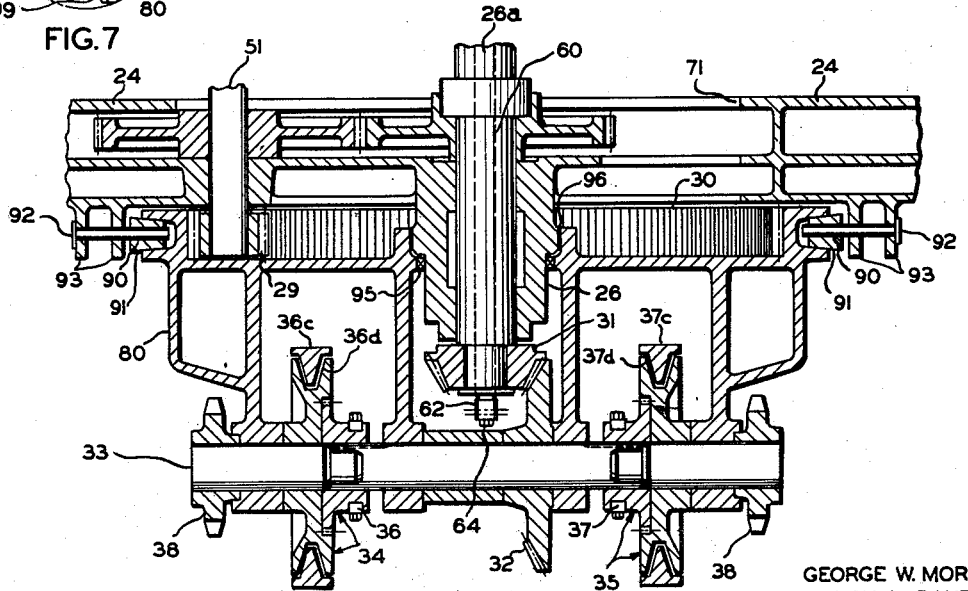
FIG. 6
GEORGE W. MORK
RALPH L. BAUER
MAX D. WOLFF
INVENTORS,
BY
ATTORNEY

United States Patent Office 3,125,226
Patented Mar. 17, 1964

3,125,226
DISCONNECT MEANS
George W. Mork, South Milwaukee, and Ralph L. Bauer and Max D. Wolff, Milwaukee, Wis., assignors to Bucyrus-Erie Company, Milwaukee, Wis., a corporation of Delaware
Filed Sept. 28, 1962, Ser. No. 227,018
9 Claims. (Cl. 212—38)

This invention relates to disconnect means and more particularly to disconnect means for vehicles having an upper works swingable relative to a lower works, wherein said lower works includes propel means for said vehicle.

Particular reference is made to large vehicles having crawler means or wheel means for moving the vehicle. Such vehicles can be cranes, excavators or the like wherein an upper works is swingable relative to a lower works.

Ordinarily, in cranes and excavators, machinery for powering the cranes and excavators is located on a machinery deck which is normally a part of the upper works. The machinery is used for driving a hoist means, crowd drum or the like. Such machinery also drives the propel means which is ordinarily located in the lower works and said propel means includes the crawlers, wheels, or the like.

With a main propel shaft in the lower works being powered by machinery in the upper works, a powered shaft means is used to transmit the power between machinery of the upper works to the lower works. In separating the upper works from the lower works, it is advantageous to have the shaft easily disengageable from the main propel shaft or driving machinery.

The advantages of being able to readily remove the upper works from the lower works are:

(1) Access for repairs in both the upper and lower works.

(2) Ease of transport of the upper works separate from the lower works.

(3) Interchangeability of upper works with other lower works and vice versa.

It is therefore an object of the invention to provide a means for allowing facile separation of the upper works from the lower works of a crane, excavator, or the like.

It is another object of the invention to provide a disconnect means for separation of power means on a swingable platform from a propel means located in the lower works of a crane, excavator, or the like.

It is an object of the invention to provide a disconnect means for a vehicle wherein an upper works containing a drive means is separable from a lower works having a driven means.

It is another object of the invention to provide a vehicle having separable lower and upper works for facilitating repairs and the like of said upper and lower works.

These and other objects of the invention will appear in the following description and drawings, of which:

FIGURE 1 is a side elevation of an excavator having an upper and lower works;

FIGURE 2 is a side elevation of the excavator of FIGURE 1 wherein the upper works and lower works are shown separated;

FIGURE 3 is a plan view of the lower works taken along line 3—3 of FIGURE 2;

FIGURE 4 is an exploded elevation of air conduit means of FIGURE 2;

FIGURE 5 is an enlarged section taken along line 5—5 of FIGURE 1;

FIGURE 6 is an enlarged section of a second embodiment taken as if at 5—5 of FIGURE 1; and FIGURE 7 is an enlarged view of a modification of FIGURE 5.

Referring now to FIGURE 1, an excavator 20 is shown having a lower works 21 and an upper works 22, wherein a boom 23 is carried on said upper works. Said upper works also includes a platform or deck 24 on which cab 27 is carried and said upper works is swingable relative to the lower works. Machinery for powering excavator 20 is shown generally as 25. Machinery 25 is ordinarily provided for raising and lowering the boom, powering the lower works, and for swinging the upper works and for powering other equipment ordinarily found on excavators or the like.

The upper works 22 is mounted on conventional swing means 28 which is carried by the lower works 21. When it is desired that the upper works be swung relative to the lower works, swing gear 29 (FIGURE 2) is powered through conventional means (not shown) by machinery 25 to swing the upper works about the axis of shaft housing 26 by the driving engagement of gear 29 with swing rack 30 (FIGURE 3).

If it is desired to propel excavator 20, the machinery 25 is caused by conventional means (not shown) to rotate shaft 26a on which is carried bevel gear 31. As gear 31 is in mesh with propel gear 32 (FIGURE 5) fixed to main propel shaft 33, the shaft 33 will turn with gear 32. Clutch units 34 and 35 may be operated individually or together by link means 36 and 37 through air means 36a and 37a (FIGURE 3) respectively to selectively cause individual or simultaneous rotation of drive sprockets 38. A chain 39 driven by each sprocket 38 rotates crawler drive gear 40 to move its respective crawler 41 to propel and/or turn the excavator 20. Braking action is occasioned by actuation of air means 36b and 37b to force brake shoe means 36c and 37c against housings 36d and 37d respectively or selectively.

Reference is now made to FIGURE 5 wherein an enlarged section of excavator 20 is shown with the platform 24 of the upper works secured to swing means 28 as by a plurality of bolts 50. Swing gear 29 mounted on a drive shaft 51 engages swing rack 30, and when shaft 51 is powered by machinery 25, the platform 24 rotates or swings on bearings 52 about shaft 26a.

If it is desired to propel excavator 20, the machinery 25 is caused by conventional means (not shown) to rotate shaft 26a in shaft housing 26. A bevel gear 31 is secured to the end of shaft 26a and rotatable therewith to mesh with and rotate propel gear 32 (FIGURE 5). The propel gear 32 is fixed to main propel shaft 33 and the rotation of gear 31 results in rotation of gear 32 and shaft 33. Clutch units 34 and 35 operatively connected to shaft 33 may be operated individually or together by link means 36 and 37 through air means 36a and 37a (FIGURE 3) respectively to selectively cause individual or simultaneous rotation of drive sprockets 38. A chain 39 driven by each sprocket 38 rotates crawler drive gear 40 to move its respective crawler 41 to propel and/or turn the excavator 20. Braking action is occasioned by air means 36b and 37b acting on brake shoe means 36c and 37c (FIGURE 3).

Shaft housing 26 is integral with platform 24 and depends therefrom through opening 70 in frame 80 of lower works 21. The opening 70 is of such extent as to allow shaft housing 26 and bevel gear 31 to pass upwardly (as viewed in the drawings) therethrough when the upper works are separated from the lower works. Also, as shaft 51 and gear 29 are carried by the platform or deck 24, the gear 29 is moved upwardly and out of mesh with swing rack 30 when the upper works are separated from the lower works.

Continuing to refer to FIGURE 5, it is noted that gear 29 is engageable with swing rack 30 and gear 31 is engageable with propel gear 32. In this manner, the upper works are coupled to the lower works for operatively swinging the upper works and propelling the excavator. The swing means 28 is secured to frame 80 as by welding or it may be bolted as by bolts 99 (FIGURE 7). The swing means includes bearings 52 wherein platform 24 rests on bearing race plate 52a. The swing means is secured to the upper works at platform 24 by bolts 50. Removal of the plurality of bolts 50 allows the upper works to be separated from the lower works. As the upper works are moved upwardly (by a hoisting means not shown), gears 29 and 31 disengage from rack 30 and gear 32 respectively, and swing race plate 52a remains on swing means 28.

It should also be noted that shaft 26a is provided with an air conduit means 60 (FIGURES 2, 4, and 5) for carrying air conduits 61. An air distributor means 62 having air outlets 63 is secured to air conduit means as by bolt 64. A gasket 65 maintains a seal between means 60 and distributor means 62. When bolt 64 is removed the air conduit means 60 is separable from said distributor means 62 in that means 60 remains with shaft 26a when the upper works 22 is separated from the lower works 21.

In FIGURE 3, the distributor means 62 is shown as associated with the lower works with air conduit 61a extending from distributor means 62 to clutch and brake operative means 36a, 37a, 36b, and 37b respectively. Thus, the air distributor means 62 maintains connections with the air means in the lower works at all times, and allows ready engagement and disengagement with air conduit means 60 when the upper works is removed or replaced in regard to the lower works.

Thus, by removing a plurality of bolts 50 and bolts 64, the upper works may be readily separated from the lower works, and air connections separated easily. The upper works can be joined to the lower works again by positioning the upper works on the lower works so that swing gear 29 once again engages with rack 30 and bevel gear 31 engages with propel gear 32. The air connections are re-established by bolting distributor means 62 to air conduit means 60. Proper alignment of the air conduit means with the air distributor means may be occasioned by use of a dowel pin.

When the upper works is separated from the lower works as hereinabove described, the upper works may be transported on a carrier or the like separate from the lower works, or the upper works and lower works in their separated condition may be loaded on a railroad flat car or the like within shipping clearance limitations of the car. It is also possible to service the separated works in a facile manner. Also, it would be possible to place the separated upper works on another similar lower works or vice versa in the event that one or the other of the works must be repaired and it is desired to use the works not being repaired by placing it on a works similar to the one being repaired.

In FIGURE 6, a second embodiment of the invention is shown wherein platform 24 is rotatably mounted on the lower works as by cone rollers 90 in roller race 91. The cone rollers 90 are secured to platform 24 by pins 92 supported in flanges 93. As in the embodiment of FIGURE 5, swing gear 29 is engageable with swing rack 30 and bevel gear 31 is engageable with propel gear 32. Shaft 28a is carried by shaft housing 26 insertable in opening 95 of frame 80. The vertical load of the upper works acts on cone rollers 90 and the horizontal load is taken at bushing 96. The shaft housing 26 being integral with platform 24 is moved out of opening 95 when said upper works is separated from the lower works and gears 29 and 31 are disengaged from rack 30 and gear 32 respectively.

To separate the upper works from the lower works in the embodiment of FIGURE 6, it is necessary to remove pins 92 from the plurality of rollers 90, and as described in connection with FIGURE 4, bolt 64 must be removed from air conduit means 60 to allow air distributor means 62 to remain with the lower works upon removal of the upper works.

Thus, two embodiments of the invention have been described to delineate the ease in which the upper works of an excavator or the like may be separated or uncoupled from the lower works.

Having now described and illustrated two embodiments of the invention, it is to be understood that the invention is not to be limited to the specific form or arrangement shown and described.

What is claimed is:

1. In a machine having an upper works and a lower works wherein said upper works is swingable relative to said lower works, said upper works includes a deck, and said lower works includes a frame and propel means for propelling said machine, said deck being supported by a swing means, and said swing means being supported by the frame of said lower works, the combination of: means for detachably securing said deck to said swing means; first gear means engageable with said swing means for swinging said upper works; second gear means for driving said propel means; said first and second gear means coupling said upper works to said lower works by engagement with said swing means and said propel means respectively; said means for detachably securing said deck to said swing means also coupling said lower works to said upper works; wherein said upper works is removable from said lower works by detaching said means for detachably securing said deck, and wherein said first and second gear means disengage from said swing means and said propel means when said upper works is removed from said lower works.

2. In a machine having an upper works and a lower works, said upper works being swingable by swing means relative to the lower works about a normally vertical axis, said lower works including a frame provided with an opening therethrough and propel means, and said upper works including a deck means having a depending shaft means aligned with said vertical axis insertable in said frame opening, the combination of: means for detachably securing said deck means to said swing means, said swing means being secured to said frame; a first gear means supported by said deck means and engageable with said swing means; and a second gear means carried by said depending shaft means and engageable with said propel means, wherein said first gear means and said second gear means are disengaged from said swing means and said propel means respectively when said means for detachably securing said deck means are detached from said swing means and said upper works is lifted from said lower works.

3. The combination of claim 2 wherein said lower works includes fluid pressure means for clutching and braking said propel means and wherein said shaft means includes an opening therethrough coaxial with said vertical axis, fluid pressure conduit means located in said opening, and fluid pressure distributor means detachably coupled to said fluid pressure conduit, wherein said fluid pressure distributor means communicates with said fluid pressure means and is detached to remain with said lower works when said upper works is removed from said lower works.

4. In a machine having an upper works and a lower works, said upper works being swingable by swing means relative to the lower works about a normally vertical axis, said lower works including a frame provided with an opening therethrough to receive a depending shaft means for nesting therein and a swing gear, said lower works also including a swing means and a propel means, and said upper works including a deck means having a depending shaft means for insertion in said frame opening, said upper works also including a swing gear for engagement with said swing means, the combination of: detachable means for securing said deck means to said swing means of said lower works; and propel gear means carried by said depending shaft means of said upper works for engagement with said propel means of said lower works; wherein said swing gear of said upper works in engagement with said swing means of said lower works and said propel gear means in engagement with said propel means operatively couples said upper and lower works, and detachment of said detachable means allows disengagement of said swing gear and said propel gear means from said swing means and said propel means respectively and removal of said upper works from said lower works.

5. In a machine having an upper works and a lower works wherein said upper works is swingable relative to said lower works about a normally vertical axis; said lower works includes a frame having an opening therein, a swing means detachably supported thereon and a propel means; and said upper works includes a deck means detachably supported by said swing means, the combination of: depending shaft means integral with said deck means for insertion in said frame opening for engagement with said propel means; and swing gear means carried by said deck means for engagement with said swing means, wherein engagement of said shaft means to said propel means and engagement of said swing gear means to said swing means couples said upper works and said lower works, said shaft means and said swing gear means being disengageable from said propel means and said swing means respectively and said shaft means being removable from said frame opening when said upper works is lifted from said lower works.

6. The combination of claim 5 wherein said swing means is detachably supported by said frame and detachment of said swing means therefrom allows removal of said upper works and said swing means from said lower works.

7. The combination of claim 5 wherein said swing means includes an upper and lower race means for containment of a plurality of bearing means, and wherein said deck means is supported on said upper race means for swinging movement relative to said lower works.

8. The combination of claim 5 wherein said swing means includes a plurality of cone rollers rotatable in roller race means, and said deck means includes a flange means provided with a plurality of openings therethrough for receiving pins; a plurality of pins supported in said flange openings for supporting said rollers for rotation in said roller race means, wherein said upper works may be removed from said lower works by removal of said pins from said flange openings.

9. The combination of claim 5 wherein said lower works includes fluid pressure means for clutching and braking said propel means and wherein said depending shaft means includes a fluid pressure conduit means for communicating fluid pressure between said upper works and said fluid pressure means in said lower works, said fluid pressure conduit means including a fluid pressure distributor means removably connected to said fluid pressure conduit means, wherein said distributor means is separated from said fluid pressure conduit means when said upper works is removed from said lower works.

References Cited in the file of this patent

UNITED STATES PATENTS

| | | | |
|---|---|---|---|
| 2,126,404 | McLean | Aug. 9, | 1938 |
| 2,343,800 | Rauch | Mar. 7, | 1944 |
| 2,481,416 | Grundon | Sept. 6, | 1949 |